March 6, 1962
S. A. BULIN
3,023,901
FAN ASSEMBLY FOR HARVESTING MACHINERY
Filed April 13, 1959
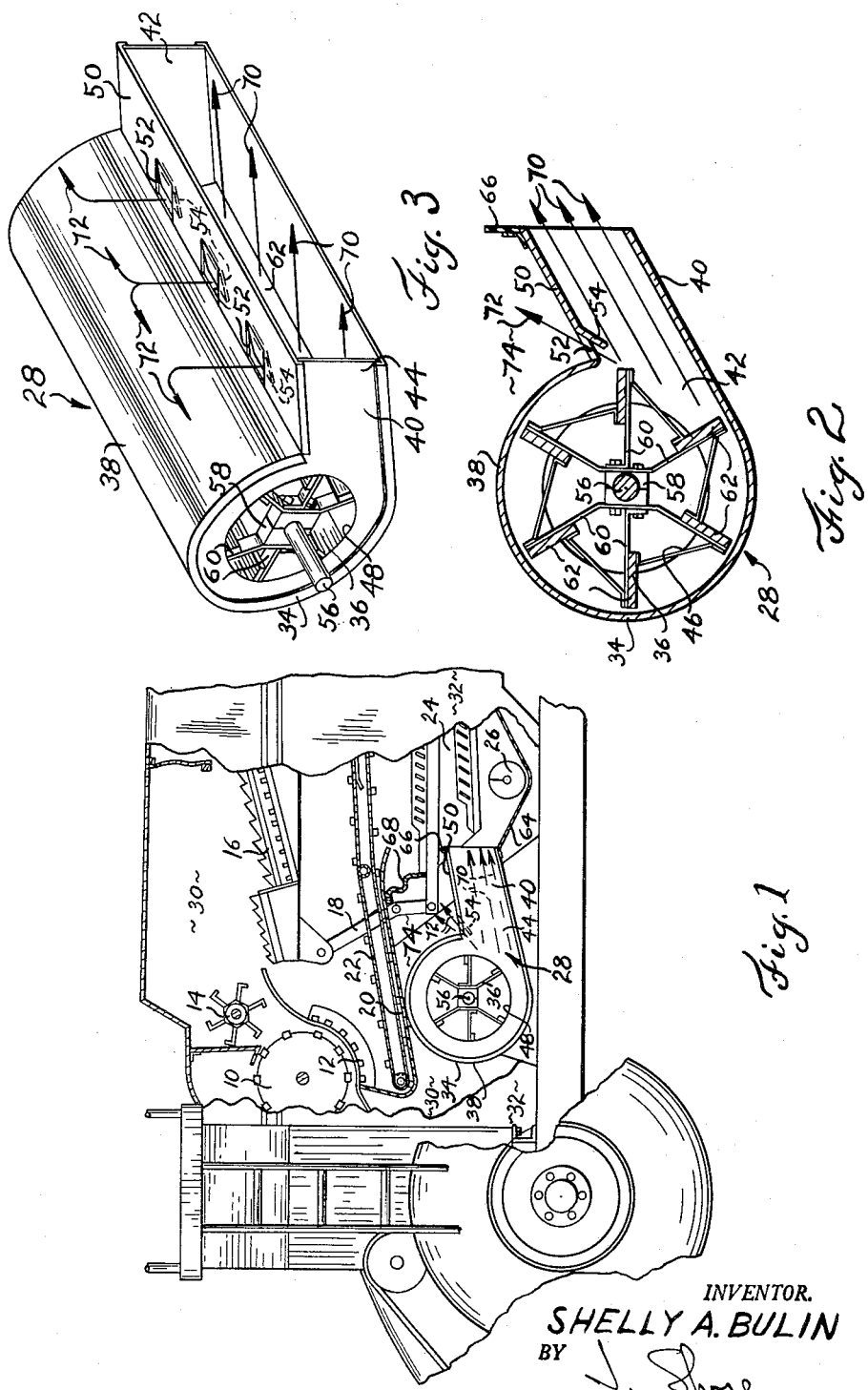
INVENTOR.
SHELLY A. BULIN
BY
ATTORNEY

3,023,901
FAN ASSEMBLY FOR HARVESTING MACHINERY

Shelley A. Bulin, Davenport, Iowa, assignor to J. I. Case Company, Racine, Wis., a corporation of Wisconsin
Filed Apr. 13, 1959, Ser. No. 806,134
2 Claims. (Cl. 209—132)

This invention relates to fans for harvesting machinery and more particularly to fans located in such machinery where debris may collect thereon.

Harvesting machinery provided with fans in the cleaning and separating mechanism have the ever present problem of the accumulation of chaff, weeds, dust, and dirt on the fan housing. The accumulated materials will collect moisture and possibly result in corrosion to the fan housing. Also, if this material is allowed to continue to accumulate, it can cause extensive damage to any shafts and operating linkages located in the area adjacent the fan housing. Sealing devices can be installed to overcome this problem; but as they are subjected to wear they may lose their efficiency after long use so as to permit leakage and make replacement necessary. Another method of combating this problem is the daily chore of manually cleaning the fan housing, but this is time consuming and sometimes difficult because of other mechanisms, such as pulleys, shafts, and linkages, located in the fan area.

Accordingly, the object of the present invention is to provide an improved fan assembly which will efficiently and continually eliminate the presence of chaff and debris in the area above the fan housing.

Other objects and advantages will become apparent from the following description when taken in conjunction with the accompanying drawings in which;

FIG. 1 is a side elevational view, with parts broken away, of the cleaning and separating mechanism of a combine which embodies the present invention;

FIG. 2 is a side elevational view, in section, of the improved fan assembly; and FIG. 3 is a perspective view of the improved fan assembly.

Referring first to FIG. 1, there is shown the cleaning and separating mechanism of a conventional combine including a threshing cylinder 10, a concave perforated grate 12, a beater 14, and a straw rack 16. Also included in the mechanism is a rocker arm 18, grain pan 20, grain conveyor rake 22, cleaning shoe 24, grain auger 26, and fan 28. This mechanism, with the exception of the fan, is enclosed by the combine housing which includes side walls 30 and 32. The various parts of the cleaning and separating mechanism operate in the conventional manner, and are driven by suitable means such as shown in United States Patent Number 2,528,275, issued to S. C. Heth on October 31, 1950, and assigned to the assignee of the present invention.

Looking now to FIGS. 2 and 3, the improved fan assembly 28 has a fan housing 34 and a fan rotor. The fan housing 34 comprises an elongated cylindrical fan chamber 38 having an outlet in the form of a delivery chamber 40, extending tangentially therefrom. The fan housing 34 has end walls 42 and 44 secured thereto which are provided with openings 46 and 48 for the introduction of air to the fan rotor 36. The upper wall 50 of the delivery chamber 40 has a series of apertures 52 which are formed by the cutting and bending downwardly of the tabs 54. The tabs 54 serve to deflect air from the delivery chamber 40 for reasons to be discussed in more detail hereinafter.

The fan rotor 36 includes a shaft 56 and a pair of spaced apart hubs 58 having substantially radially extending spokes 60 secured thereto. Fan blades 62 are coextensive with fan housing 34 and are secured to the outer ends of spokes 60.

It is to be noted that the side walls 30 and 32 of the combine housing enclose the aforementioned cleaning and separating mechanism with the exception of the fan 28 which is open to the outside of the combine housing. This is done to keep the threshing cylinder, straw rack, grain pan etc. isolated within the combine housing and to allow only the pressurized air from the fan 28 to enter the interior of the housing.

The fan is fixed relative to the housing by suitable connectors which connect the endwalls 42 and 44 to sidewalls 30 and 32 respectively. Conventional bearing supports (not shown) are located on the frame of the combine to journal shaft 56. Also, the lower floor 64 of the combine housing connects to the lower wall of the delivery chamber 40 of the fan 28. Additional sealing is accomplished by the flexible wiper strip 66 which is attached to the upper wall 50 of the delivery chamber 40 and is in contact with the lower portion of cleaning shoe 24. A flexible seal 68 is provided between the cleaning shoe 24 and the bottom surface of the grain pan 20.

It will now be understood that as the pressurized air denoted by arrows 70, flows from the fan chamber 38 into the delivery chamber 40, a small portion of this pressurized air, denoted by arrow 72, is deflected by the air deflectors 54 upwardly through apertures 52 into the area 74 above the fan housing 34. This then provides area 74 with pressurized air and because the area 74 is open at its ends to the outside of the combine there is a pressure differential which causes the pressurized air to flow to the outside of the combine.

As the harvested grain is separated from its attached straw by cylinder 10 and the concave grate 12, the grain, chaff, and smaller particles of debris drop through the grate 12, to the grain pan 20 and are conveyed to the cleaning shoe 24. The oscillatory motion of the cleaning shoe 24, provided by the rocker arm 18, cooperating with the air blast from the fan 28, separates the grain from the chaff and other debris. The clean grain being heavier than the debris will fall through the sieves of the cleaning shoe 24 to the combine floor 64 and be conveyed to a storage bin (not shown) elsewhere on the combine by grain auger 26. The chaff and other debris will be held in suspension over the cleaning shoe 24, by the air blast from the fan 28. The motion of the cleaning shoe 24, moves the debris out the open rear end of the combine.

Due to the presence of the chaff and debris in the combine during the cleaning and separating operations certain portions of this material may leak past the sealing devices 66 and 68 into the area 74, and fall onto the fan housing 34. Heretofore, this debris would accumulate on the fan housing 34 generally in the area where the upper portion 50 of the delivery chamber 40 joins the fan chamber 38. If this debris is allowed to remain there it will collect moisture and start corrosion which can eat through the housing 34. Other difficulties could occur, such as obstructing the movement of operating linkages and "packing" the bearings of any shafts located in area 74. It will be apparent that the presence of this debris in the area 74 can cause extensive damage to the combine which could result in great expense and labor involved in replacing the defective parts. As previously stated, the improved fan 28 provides apertures 52 and air deflectors 54 which direct certain amounts of pressurized air into the area 74. As the pressurized air flows into the area 74, it rises and is deflected downwardly by the underside of grain pan 20. This action results in a turbulent movement of the pressurized air located in area 74. The side walls 30 and 32 of the combine housing are open at the ends of area 74 which allows the pressurized turbulent air to escape due to the pressure differential to the outside of the combine. The air flowing from area 74 carries with it any debris which may have collected therein. This operation will continue as long as the combine mechanism is operating and thus serves to continually eliminate debris from the upper surface of the fan housing 34.

It will now be appreciated that the present invention provides an inexpensive and positive method of preventing the accumulation of chaff and debris in the area above the fan assembly of a harvesting machine. The apertures and air deflectors in the improved fan assembly which provide the pressurized air circulation in the area above the fan housing will overcome any deficiency which may occur in the sealing devices provided on present combines to combat this problem. Also, this improved fan assembly will eliminate the time consuming daily task of cleaning the fan housing.

While I have shown and described one machine in which the invention may be advantageously embodied, it is to be understood that the machine shown has been selected merely for the purpose of illustration or example, and that the improved fan assembly can be utilized on various machines in which the problem exists without departing from the true spirit and scope of the invention.

What I claim as new and desire to obtain by Letters Patent is:

1. In a combine of the type having a cleaning and separating means including a fan housing and assembly for supplying pressurized air to the combine to assist in the cleaning and separating of the grain passing through the combine, sealing means for preventing the accumulation of debris on the fun housing, said fan housing including an elongated cylindrical fan chamber having an air inlet at each end thereof, and a generally horizontal delivery chamber extending tangentially therefrom, the delivery chamber having upper and lower walls, the lower wall being joined to the periphery of the fan chamber to form a tangential extension thereof, the upper wall being joined to the fan chamber and extending in a direction generally parallel to the lower wall, fan means rotatably supported in said cylindrical chamber and adapted to supply pressurized air to the combine for cleaning and separating the grain being directed therethrough, a plurality of openings defined in the upper wall of the delivery chamber and located proximate the intersection of the upper wall and the fan chamber, and a plurality of deflectors disposed adjacent said openings and extending into the delivery chamber to direct air from the delivery chamber to the outer portion of the fan housing to prevent the accumulation of debris adjacent the upper wall of the delivery chamber in the event such debris leaks past said sealing means.

2. In a combine of the type having a cleaning and separating means including a fan housing and assembly for supplying pressurized air to the combine to assist in the cleaning and separating of the grain passing through the combine, sealing means for preventing the accumulation of debris on the fan housing, said fan housing including an elongated cylindrical fan chamber having an air inlet at each end thereof, and a generally horizontal delivery chamber extending tangentially therefrom, the delivery chamber having upper and lower walls, the lower wall being joined to the periphery of the fan chamber to form a tangential extension thereof, the upper wall being joined to the fan chamber and extending in a direction generally parallel to the lower wall, fan means rotatably supported in said cylindrical chamber and adapted to supply pressurized air to the combine for cleaning and separating the grain being directed therethrough, and a plurality of openings defined in the upper wall of the delivery chamber and located proximate the intersection of the upper wall and the fan chamber to direct air from the delivery chamber to the outer portion of the fan housing to prevent the accumulation of debris adjacent the upper wall of the delivery chamber in the event such debris leaks past said sealing means.

References Cited in the file of this patent

UNITED STATES PATENTS

| 1,081,593 | Eisenhart | Dec. 16, 1913 |
| 1,190,471 | Schuette | July 11, 1916 |
| 2,395,163 | Carroll | Feb. 19, 1946 |
| 2,528,275 | Heth | Oct. 31, 1950 |
| 2,649,242 | Payne | Aug. 18, 1953 |